Sept. 15, 1959 H. S. TAYLOR 2,903,798
MAGNETIC COMPASS
Filed March 5, 1956 2 Sheets-Sheet 2
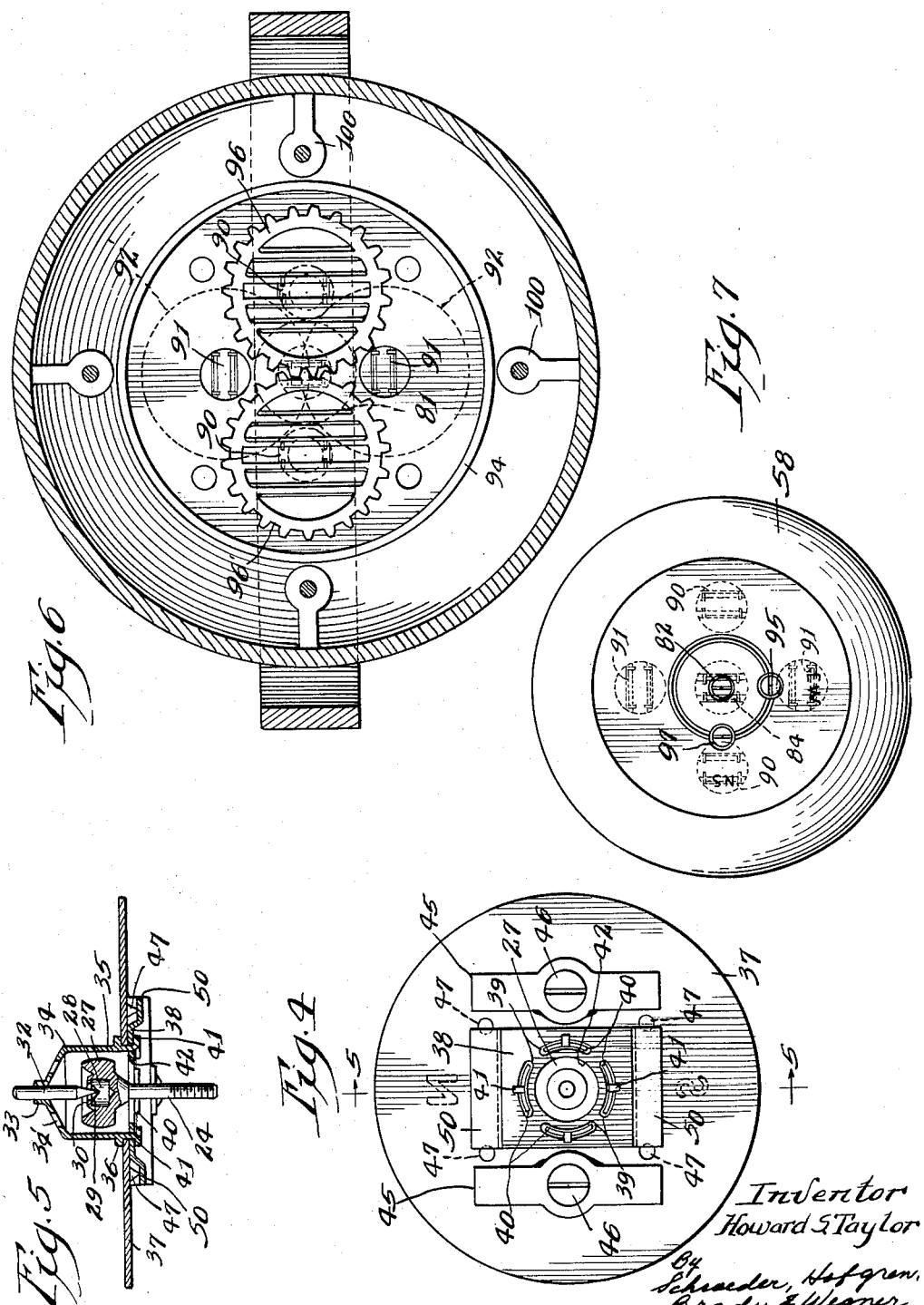

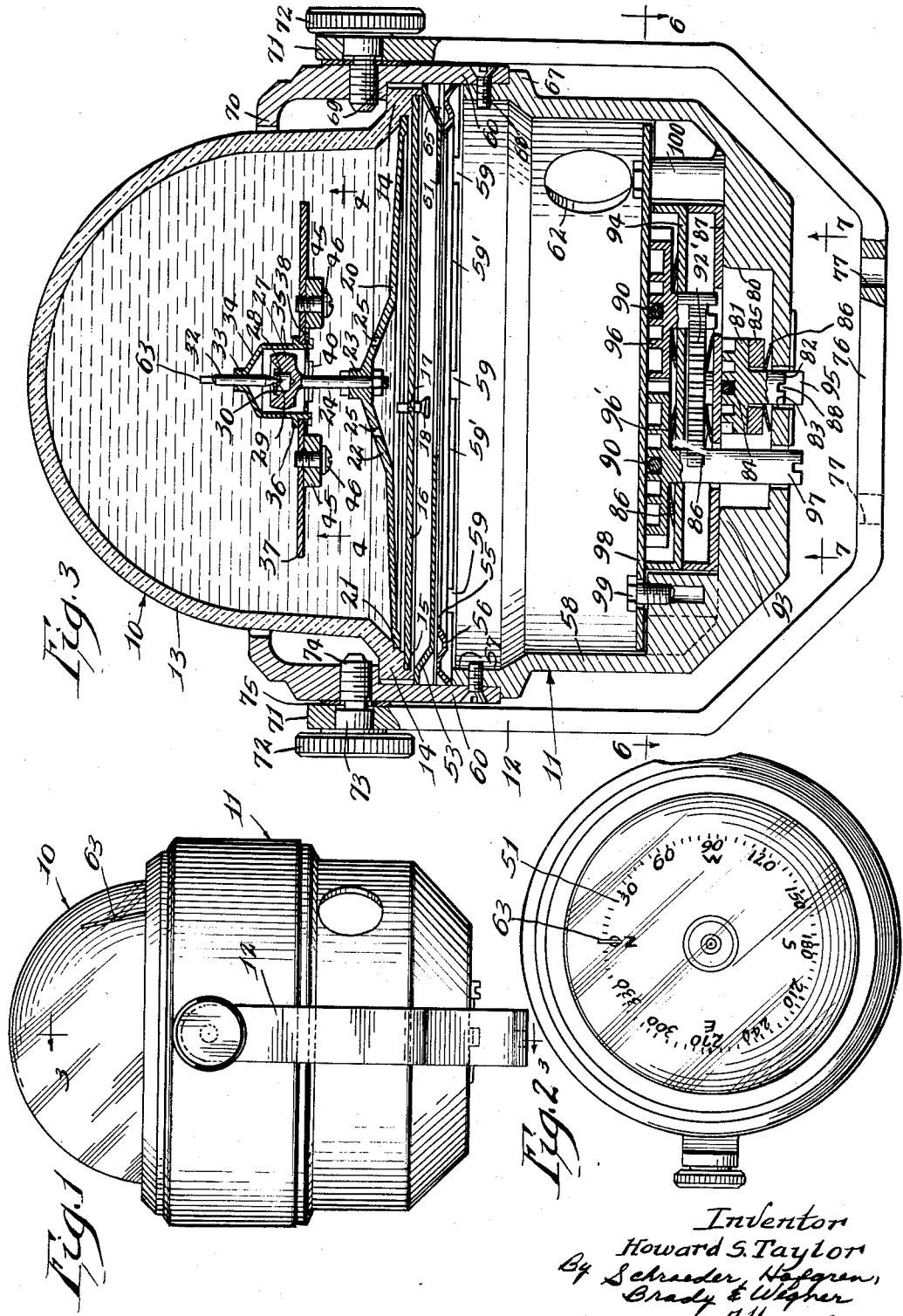

United States Patent Office 2,903,798
Patented Sept. 15, 1959

2,903,798

MAGNETIC COMPASS

Howard S. Taylor, Fox River Grove, Ill., assignor to Airguide Instrument Company, a corporation of Illinois Application March 5, 1956, Serial No. 569,647

10 Claims. (Cl. 33—225)

This invention relates to magnetic compasses and particularly to magnetic compasses adapted for marine use, and has for a general object the provision of a new and improved compass of the character described.

A more specific object is to provide a new and improved compass of the character described, including a compass bowl or liquid compartment formed of parts comprised of thermoplastic materials which may be fused together so as to form an air-tight and liquid-tight chamber for containing the fluid in which the movably mounted indicating parts of the compass are supported.

A further object is to provide a new and improved compass of the character described including novel means for movably mounting the calibrated indicating dial immersed in liquid so as to minimize vibrations to which the dial is subjected and to stabilize its operation.

Another object is to provide a new and improved compass of the character described including novel means for mounting the compass bowl or liquid compartment in a compass case.

An additional object is to provide a new and improved compass of the character described, including a calibrated dial for indicating direction, the dial having mounted thereon primary magnets sensitive to the influence of the earth's magnetic forces, and having means for balancing the dial to obtain a high degree of accuracy and operation.

Another object is to provide a new and improved means for compensating adjustments of the position of the dial necessitated by the influence of nearby masses of magnetic material.

A further object is to provide a new and improved compass of the character described, having a first compensating magnet of predetermined magnetic strength centrally located relative to the primary magnets and mounted for adjustment to provide a coarse adjustment to compensate for a substantial portion of the magnetism of adjacent external masses of magnetic material, and a plurality of auxiliary compensating magnets of predetermined strength less than the strength of the first compensating magnet adjustably mounted to provide a fine adjustment to compensate for the remaining magnetism of adjacent external masses of magnetic material.

Other objects and advantages will become readily apparent from the following detailed description taken in connection with the accompanying drawings, in which:

Fig. 1 is a side elevational view of a compass embodying the principles of my invention;

Fig. 2 is a plan view of the compass illustrated in Fig. 1;

Fig. 3 is an enlarged sectional view taken at about the line 3—3 of Fig. 1;

Fig. 4 is a bottom plan view illustrating the structure of the indicating dial, taken at about the line 4—4 of Fig. 3;

Fig. 5 is a vertical sectional view taken at about the line 5—5 of Fig. 4;

Fig. 6 is a sectional view taken through the compass case and mounting bracket, at about the line 6—6 of Fig. 3; and Fig. 7 is a bottom plan view of the compass case, taken at about the line 7—7 of Fig. 3, at a reduced scale relative to the scale of Fig. 3.

While an illustrative embodiment of the invention is shown in the drawings and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

Referring now to the drawings and particularly to Figs. 1, 2, and 3, the invention is embodied in a compass which includes a compass bowl or liquid compartment 10 mounted in a compass case 11 adapted to be mounted by means of a mounting bracket 12 on available supporting means forming a part of a boat or other vehicle with which the compass may be utilized.

The visible structure of the present compass would indicate to an observer only the mounting structure and a transparent dome-like liquid bowl in which the compass disc is housed. The structure of the bowl and disc is mostly hidden from view and quite important. As seen best in Fig. 3, the compass bowl or liquid compartment 10 comprises an inverted bowl-shaped part 13 of transparent plastic material, such as an acrylic composition, which terminates at its base in an annular rim, including an outwardly extending annular flange 14. The bottom surface of the annular flange 14 is recessed in a region radially inward of its periphery, as indicated at 15, to form a seat which receives the outer periphery of a circular disc or diaphragm 16 comprised of a translucent thermoplastic material, such as vinyl composition, which forms the base or bottom of the liquid compartment. The outer periphery of the circular disc 16 is fused to the under surface of the flange 14 by means of an adhesive cement and the application of heat and pressure so as to form a liquid-tight, air-tight joint to form a sealed compartment for retaining a liquid in which the movable indicating parts of the compass are mounted. The disc 16 is provided with an opening 17 which may be utilized in filling the liquid compartment, and which may be closed by a plug 18, also of thermoplastic material, such as the acrylic composition of which the bowl shaped part 13 is formed, the plug 17 thereafter being heat-fused to the disc 16 with the aid of an adhesive cement to provide a sealed joint with the disc 16. The liquid compartment 13 is filled with a clear oil, which is relatively thin and light in weight, having a consistency similar to that of kerosene.

The movable indicating parts of the compass are supported within the liquid compartment 10 and the means for supporting the movable parts comprises in part a circular disc 20 constructed of a flexible, resilient material, such as a nylon composition. The circular disc 20 is held in position in the bottom of the liquid compartment by having its peripheral portion 21 held between the base of the bowl-shaped part 13 and the diaphragm 16 which closes the bottom of the liquid compartment. The disc 20 is comprised of a relatively hard but flexible nylon material, and is molded to form at its center an upwardly inclined conical portion 22 which terminates at the center of the disc in a boss 23 which is internally threaded to receive the threaded end of a post 24. The central conical portion of the disc 20 is formed with a plurality of openings 25 therethrough, which permit the flow of liquid to opposite sides of the disc 20.

The upper end of the post 24 terminates in an enlarged head 27 which is formed with an axially aligned, upwardly facing pocket which receives a jewel 28 formed with an axially aligned, upwardly facing, conically shaped pivot socket 29 (see Fig. 5 also). The jewel pocket in the upper enlarged end 27 of the post 24 may be formed with a thin, upwardly extending flange 30 adapted to be turned inwardly over the jewel 28 to retain the jewel in position.

The upwardly facing pivot socket 29 formed in the jewel 28 receives the lower pointed end of pivot needle or pin 32. The shank of the pivot pin 32 is fitted in the reduced upper end 33 of a dome-shaped, sleevelike dial support or hub 34 having an enlarged lower end 35 which skirts the enlarged upper end 27 of the post 24 in radially spaced relationship and extends to a position below the level of the head 27. Adjacent its lower end, the skirt portion 35 is formed externally with an outwardly extending flange 36. A circular dial 37 formed with a central aperture is fitted on the lower end of the skirt portion 35 and abuts against the bottom surface of the flange 36. The dial 37 is retained in place on the skirt portion 35 by means of a plate 38 which, as seen in Fig. 4, is formed with a plurality of arcuately shaped slots 39 therethrough to receive similarly shaped projecting portions 40 projecting from the lower end of the skirt portion 25. Each of the arcuately shaped projecting portions 40 on the skirt 35 includes a finger 41 which may be bent radially outwardly against the plate 38 to retain the parts in assembled relationship.

The plate 38 is formed with a central opening 42 which is larger than the lower portion of the post 24 and concentric therewith, but which is slightly smaller than the enlarged end portion 27 of the post 24. The construction and arrangement of the mounting for the dial 37 is such that the dial is free to rotate in the horizontal plane illustrated about the axis of the post 24 and the pivot needle 32. At the same time, the skirt portion 35 embraces the head 27 in radially spaced relationship, and the central opening 42 in the plate 38 is enlarged relative to the lower portion of the post 24 which it embraces so that the dial 37 is also free to tilt about any horizontal axis passing through the mounting of the pointed end of the pivot needle 32 in the pivot socket provided in the jewel 28. The central aperture 42 in the plate 38 is of slightly smaller proportions than the diameter of the head 27 so as to retain the point of the pivot needle 32 within the pivot socket 29 and thus prevent removal of the dial and the dome-shaped part 34 in the event the compass is inverted. Openings 34' in the upper portion of the dome-shaped dial support 34 permit the flow of liquid on movement of the dial and dial support.

As seen in Figs. 3 and 4, a pair of primary permanent magnets 45 are secured to the underside of the dial 37 in parallel relationship on opposite sides of the axis of the post 24. The magnets 45 are each secured to the dial 37 by means of a screw 46, and each may be adjusted about the axis of the screw 46 between limits defined by small conically shaped projections 47 (Figs. 4 and 5), provided on the underside of the dial 37.

It will be appreciated that in operation of the compass, it is desirable that the dial 37 be perfectly balanced about the pivot mounting of the needle 32 in the pivot socket 29 in order that the dial will be maintained in a perfectly horizontal position at all times. Also, it will be appreciated that in manufacturing the dial 37 and the parts which are attached thereto for movement therewith, it is impractical to maintain a sufficiently high degree of accuracy in manufacturing tolerances that the dial 37 is perfectly balanced when completed and mounted in assembled relationship with the parts attached thereto. For example, when the magnets 45 are completed, one may be slightly heavier than the other. Also, one of the magnets 45 may inadvertently be stronger than the other, so as to cause one side of the dial to dip. Additionally, in the northern United States, for example, the earth's magnetic forces naturally dip toward the North Pole, and this causes the north portion of the magnets and dial to dip slightly. To offset the latter condition, the south ends of the magnets 45 may be made slightly heavier. In any event, so many factors must be taken into consideration that it is virtually impossible to manufacture the dial and the parts attached thereto in such a manner that the dial will be perfectly balanced when mounted. Accordingly, means have been provided to be utilized in balancing the dial, and this means includes at opposite ends of the plate 38, transversely extending ledges 50 which are formed by bending the plate 38 so that the ledges 50 are in spaced parallel relationship to the under surface of the dial 37. The ledges 50 may be utilized to support tiny drops of solder or other weighting means which may be placed at selective positions along the ledges 50 to balance the dial so that it is maintained in a perfectly horizontal position at all times.

The dial 37 is preferably comprised of a milky white translucent nylon composition. The nylon composition has the advantage of permanency when utilized in the oil which fills the liquid compartment 10. When utilized over extended periods of time in the oil filling the compartment 10, the nylon dial will not decompose nor is it subjected to corrosive effects sometimes encountered with metal dials. The dial 37 is provided adjacent its outer periphery, as seen in Fig. 2, with a scale 51 computed in degrees, from zero to 360, and is coated with a coloring material of a dark hue, preferably black. The scale 51 is formed by screening out the graduations which represent the degree marks, and similarly screening out the numbers and letters which are utilized in indicating direction in degrees, so that the entire upper surface of the dial is coated with the coloring material, except the graduations and whatever numbers and letters are desired. In this manner, when the under surface of the dial is lighted as explained hereinafter, the graduations and numbers are lighted and show clearly while the remaining portion of the dial is dark. The use of a nylon dial having the coloring material coated thereon as described above, also has the advantage of color fastness. The nylon composition retains the color coated thereon for extended periods of time where other softer plastics are subject to discoloration.

The disc 20 in the bottom of the liquid compartment 10 is molded of a nylon composition so as to provide a resilient central, conical portion 22 which is flexible enough to absorb vibrations to which the compass is subjected exteriorly, so that such vibrations are not transmitted to the dial 37, thus serving to stabilize the operation of the compass. The temperature coefficient of expansion of the nylon composition utilized in manufacturing the disc 20 is comparable to the coefficient of expansion of the acrylic composition utilized in constructing the bowl-shaped part 13 so that no serious stresses and strains occur within the liquid compartment on changes in temperatures to which the compass may be subjected. The nylon composition of the disc 20 is durable when utilized for extended periods of time in the oil which fills the liquid compartment 10. No shrinkage or decomposition of the disc occurs even with extended use as is experienced with some other plastic compositions.

The compass bowl or liquid compartment 10 is securely mounted in the case generally designated 11 by means including a dish-shaped spacer plate 53 having its raised outer peripheral portion engaging the under surface of the outwardly extending flange 14 formed at the base of the bowl-shaped part 13. In a region spaced radially inwardly from its outer periphery, the spacer plate 53 is supported on an annular retaining ring 55. The retaining ring 55 is formed with concentric annular corrugations 56, the innermost one of which supports the spacer plate 53, and the outermost of which rests on the upper rim 57 of a cup-shaped case bottom 58 forming a part of the case 11. The retaining ring 55 is formed with circumferentially spaced recesses 59 which extend radially inwardly from the outer periphery of the ring 55. The ring 55 is preferably constructed of a spring-like bronze material and the recesses 59 serve to define arcuate segments at the periphery of the ring which tend to dig into the inner surface of the cylindrical wall of an upper sleeve-like case part 60 also forming a part of the case 11. In this manner, the projecting arcuate portions 59' serve to retain the compass bowl 10 positioned in the sleeve-like part during assembly and dis-assembly of the case 11.

The circular dish-shaped spacer plate 53 is formed with an off center aperture 61 therein which may be positioned adjacent an aperture 62 formed in the cylindrical side wall of the cup-shaped case bottom 58. The aperture 62 is adapted to receive a lighting fixture which gives off light passing upwardly through the opening 61 and thereby concentrated in an area in the vicinity of a lubber line 63 (Figs. 1, 2, and 3), stationarily mounted in the liquid compartment as by having its base embedded in the disc 20. Concentration of the light in this manner at that portion of the dial in the immediate vicinity of the lubber line 63 facilitates reading the compass, particularly in the dark. Desirably, the compass includes a circular disc 65 of translucent colored material, preferably red, interposed between the spacer plate 53 and the retaining ring 55. The disc 65 serves to effect a red glow at that portion of the dial adjacent the lubber line 63. Experiments have indicated that the provision of a red glow at the dial is beneficial in adapting the eye to vision of the dial in the dark.

The upper sleeve-like case part 60 telescopes onto the upper end of the cup-shaped case bottom 58, as seen in Fig. 3, and engages a flange 67 formed on the exterior of the cup-shaped case bottom 58. The parts 58 and 60 are held together by means such as screws indicated at 68. At about its midportion, the sleeve-like case part 60 is formed internally with a downwardly facing shoulder 69 which engages the upper surface of the flange 14 at the base of the bowl-shaped part 13. In this manner, the compass bowl or liquid compartment 10 is securely mounted in the case 11. The upper extremity of the sleeve-like part 60 is turned inwardly at 70 so as to closely fit over the bowl-shaped part 13.

The case 11 is supported by the mounting bracket 12 previously referred to, the mounting bracket having its opposite upper end portions 71 connected respectively to diametrically opposite sides of the sleeve-like upper case part 60 by means such as mounting screws 72. Each of the mounting screws 72 is formed with an enlarged shank portion 73 rotatably fitted in the mounting bracket 12 and a reduced, threaded end portion 74 screwed into the part 60. A fibre washer 75 is fitted on the screw 72 between the bracket portion 71 and the case part 60. The mounting of the compass case on the bracket 12 as illustrated is such that the screws 72 may be tightened to hold the compass case rigid relative to the mounting bracket 12, or the screws 72 may be loosened so that case 11 is permitted to swing freely about the axis of the mounting screws 72. A flattened lower portion 76 of the mounting bracket 12 may be provided with mounting holes 77 adapted for use in securing the mounting bracket to the boat or vehicle with which the compass is utilized.

When the compass is mounted on a boat or vehicle, it frequently occurs that such boat or vehicle includes masses of magnetic material associated therewith which cause a deviation of the dial 37 and the magnets 45 secured thereon from a true north position. In order to compensate for the magnetism of such adjacent external masses of magnetic material, the compass includes compensating magnets adjustably mounted in the lower portion of the case to be adjustably positioned to offset the distractive effects of the external magnetic material. To this end, the bottom wall of the lower cup-shaped case bottom 58 is recessed centrally as indicated at 80 to house a centrally disposed magnet carrier 81 having a shaft portion 82 rotatably mounted in an opening 83 for adjustment about an axis aligned with the axis of the post 24 in the compass bowl 10. The carrier 81 is preferably formed of a non-magnetic material, such as nylon, and on its upper surface is formed with a diametrically extending slot which receives a rod-shaped permanent compensating magnet 84 of pre-determined magnetic strength considerably less than the strength of either of the magnets 45. The shaft 82 of the magnet carrier 81 receives a spacer 85 and a thrust washer 86 which biases the carrier into engagement with the under surface of a cup 87 which carries additional compensating magnets. The end portion of the shaft 82 is formed with an open transversely extending slot 88 adapted to receive a tool such as a screwdriver for adjusting the position of the magnet 84. The longitudinal axis of the magnet 84 extends in a direction parallel to the axes of the primary magnets 45 on the dial 37 when the compensating magnet 84 is adjusted for zero compensation and when the dial 37 is positioned at zero deviation from north. The magnet 84 is adapted to function as a coarse adjustment for compensating for a substantial portion, about 40 to 75 percent, of the external field created by adjacent magnetic materials outside the compass.

In order to compensate for the remaining external field, I utilize two pairs of additional compensating permanent magnets each of pre-determined lesser magnetic strength than the magnet 84. The auxiliary compensating magnets include a pair of parallel, rod-shaped north-south magnets 90 (Figs. 3, 6, and 7) which lie on opposite sides of the axis of the magnet carrier 81 with their axes parallel and parallel to the axis of the magnet 84 when each of the magnets 84 and 90 is adjusted for zero compensation. The auxiliary compensating magnets also include a pair of parallel, rod-shaped east-west magnets 91 (Figs. 6 and 7) which lie at diametrically opposite positions relative to the axis of the magnet carrier 81 with their axes parallel to each other and normal to the axes of the magnets 84 and 90 when each of the compensating magnets is positioned for zero compensation. The arrangement of the auxiliary compensating magnets 90 and 91 is such that when adjusted for zero compensation, their axes extend along lines forming a square having as its center, the axis of the magnet carrier 81 and hence the axis of the post 24.

The east-west magnets 91 are carried by similar magnet carriers 92 and 92' both of which are housed in the compensator cup 87, previously referred to, mounted in the lower portion of the case bottom 58 and supported on a wall 93. The carriers 92 and 92' are each preferably constructed of a hard nylon composition, and each is formed on its periphery with gear teeth meshing with similar gear teeth formed on the other carrier. Each of the carriers 92 and 92' includes a centrally located shaft rotatably mounted in the cup 87 and each carrying a thrust washer, similar to that illustrated at 86, biasing the carrier against the bottom wall of an overlying compensator cup 94. The shaft 95 of the carrier 92' is elongated and projects from the bottom of the case 58, as seen in Figs. 3 and 7, to permit simultaneous adjustment of the magnets 91 in opposite directions about axes normal to the planes in which the magnets lie.

The north-south magnets 90 are carried by geared magnet carriers 96 and 96', similar to the carriers 92 and 92', and housed in the compensator cup 94 which is supported on the upper rim of the underlying compensator cup 87, as seen in Fig. 3. The gear teeth formed on the carriers 96 and 96' are in mesh, and the carrier 96' is provided with an elongated shaft 97 which projects from the bottom of the case 58, as seen in Figs. 3 and 7, to permit simultaneous adjustment of the magnets 90 in opposite directions about axes extending normal to the plane in which the magnets lie. Thrust washers 86 embracing the shafts of the carriers 96 and 96' bias the carriers into engagement with a cover plate 98 secured by means such as the screws 99 to upstanding posts 100 provided in the case member 58.

The provision of magnet carriers constructed of nylon serves, of course, to house the compensating magnets in non-magnetic materials. Additionally, the geared carriers 92, 92', 96, and 96', when constructed of nylon, serve to provide self-lubricating gears which are corrosion resistant even when subjected to the moist atmospheres attendant marine uses.

In operation, the compass is given a north-south heading and the central compensating magnet 84 is adjusted to correct the compass to a minimum deviation possible by adjustment of the magnet 84. Thereafter, the compass is positioned at an east-west heading and the magnet 84 is again adjusted to give the minimum deviation possible with adjustment of the magnet 84. Thereupon, the magnet 84 is adjusted to a position midway between the adjustments referred to above so as to obtain the maximum compensation in north-south and east-west directions. The centrally disposed compensating magnet 84 is particularly useful in applications where a rather powerful external field must be compensated for, and the adjustment of this magnet as described above will serve to provide a coarse adjustment which compensates for 40 to 75 percent of the external field which must be offset. The two pairs of auxiliary compensating magnets 90 and 91, each of lesser strength than the magnet 84, may then be adjusted, and these magnets constitute a fine adjustment for compensating for the remainder of the external magnetic field. Because of the lesser strength of these magnets, a higher degree of accuracy is obtained in the range where the external field is completely compensated for.

It should now be apparent that I have provided a new and improved magnetic compass which accomplishes the objects set forth hereinabove at the beginning of the specification.

I claim:

1. In a magnetic compass; an inverted liquid bowl of transparent material terminating at its base in an annular rim including a radially outwardly extending flange, a circular diaphragm closing the bottom of the bowl and having its periphery secured to said rim to form a liquid-tight joint, a compass case comprising a cup-shaped case bottom and a separate sleeve telescopically mounted on the upper portion of the case bottom and extending upwardly therefrom, a radially inwardly extending, downwardly facing, annular shoulder formed in said sleeve and engaging the upper surface of the outwardly extending flange at the base of the bowl, and means supporting the bowl on the upper end of the cup-shaped case bottom including a circular dish-shaped spacer fitted in said sleeve and having a raised periphery engaging the bottom surface of the flange at the base of the bowl, and an annular retaining ring in said sleeve having annular concentric corrugations and circumferentially spaced recesses extending inwardly from its outer periphery with the inner corrugation supporting the dish-shaped spacer and the outer corrugation supported on the annular top rim of the cup-shaped case bottom and engaging the inside of said sleeve to resiliently retain the bowl in said sleeve, the radially outwardly projecting portions of the retaining ring between said recesses engaging the sleeve to releasably retain the bowl in the sleeve in the absence of the cup-shaped case bottom.

2. In a magnetic compass having a lubber line stationarily mounted in a liquid compartment and a circular calibrated dial having secured thereon permanent magnet means sensitive to the earth's magnetic forces; means mounting the dial in the liquid compartment for movement relative to the lubber line to indicate direction, comprising, an upstanding post mounted in the liquid compartment and formed with a radially enlarged upper end having means forming an upwardly facing pivot socket, a pivot needle having a lower pointed end supported in said pivot socket, a dome-like dial support having a reduced upper end fitted on the shank of the pivot needle and having an enlarged lower skirt extending downwardly below the enlarged upper end of said post and skirting the upper end of the post in radially spaced relation thereto, an annular radially outwardly extending flange on said skirt adjacent its lower end, said dial having a center aperture receiving the lower end of said skirt with the dial engaging the lower surface of said flange, a retainer plate engaging the under surface of said dial to retain the dial in engagement with said flange, said retainer plate having openings therethrough at the lower end of said dial support, and said dial support having fingers projecting through said openings and bent against the plate for retaining the dial support, the dial and the retainer plate in assembled relationship, the retainer plate being disposed in spaced relation below the enlarged upper end of said post and being formed with a central aperture concentric with said post, said central aperture being enlarged relative to the lower portion of the post to permit rotation and tilting movement of the dial and being smaller than said enlarged end of the post to retain the point of the pivot needle in its pivot socket.

3. In a magnetic compass having a lubber line stationarily mounted in a liquid compartment, a circular, calibrated dial, and means mounting the dial for rotation and tilting movement in the liquid compartment; a pair of elongated permanent magnets arranged in generally parallel relationship and secured to the underside of the dial for limited adjustment about pivot axes normal to the plane of the dial, and a counterbalance plate secured to the underside of the dial in the central portion thereof, said plate being formed at opposite ends thereof with ledges in underlying, spaced, parallel relation to the dial and extending transversely to the longitudinal axes of said magnets for supporting at selective positions thereon weight means for balancing the dial and parts thereon to normally maintain the dial in a horizontal plane.

4. In a magnetic compass having a lubber line stationarily mounted in a liquid compartment, a circular, calibrated dial, and a pair of elongated permanent magnets arranged in generally parallel relationship and secured to the underside of the dial for limited adjustment about pivot axes normal to the plane of the dial; means mounting the dial in the liquid compartment for movement relative to the lubber line to indicate direction, comprising, an upstanding post mounted in the liquid compartment and formed with an enlarged upper end, means providing an upwardly facing pivot socket on the enlarged upper end of said post, a pivot pin having a lower pointed end supported in the pivot socket, a sleeve-like dial support having a reduced upper portion secured on the shank of the pivot pin and having an enlarged lower portion skirting the upper end of said post in spaced relation thereto, means securing the dial to the lower portion of the dial support below the enlarged upper end of the post, and a plate secured to the underside of the dial in the central portion thereof, said plate being formed with a central aperture concentric with the post, said central aperture being enlarged relative to the lower portion of the post to permit rotation and tilting movement of the dial and being smaller than the enlarged end of the post to retain the point of the pivot pin in its pivot socket, said plate also being formed at opposite ends thereof with ledges in underlying spaced, parallel relation to the dial and extending transversely to the longitudinal axes of said magnets for supporting at selective positions thereon weight means for balancing the dial and parts thereon to normally maintain the dial in a horizontal plane.

5. In a magnetic compass having a case, a stationarily mounted lubber line, a disc with a circular scale, means mounting the disc for movement relative to the lubber line to indicate direction, and a pair of primary magnets sensitive to the earth's magnetic forces secured to the disc in spaced, generally parallel relationship; means for compensating for the magnetism of adjacent external masses of magnetic material, comprising, a compensating permanent magnet of predetermined strength mounted in the case for adjustment to compensate for a substantial portion of the magnetism of adjacent external masses of magnetic material, and a plurality of auxiliary compensating permanent magnets of predetermined strength less than the strength of the first recited compensating magnet mounted in the case for adjustment to compensate for the remaining magnetism of adjacent external masses of magnetic material.

6. In a magnetic compass having an upstanding post in a liquid compartment, a disc with a circular scale, means mounting the disc on the post for rotation and tilting movement relative thereto, and a pair of primary permanent magnets secured to the disc on opposite sides of the post in generally parallel relationship; a first compensating permanent magnet of predetermined magnetic strength having its magnetic axis intersecting the axis of the post normal thereto, means mounting the compensating magnet for adjustment about the axis of the post to provide a coarse adjustment for compensating for a substantial portion of the magnetism of external magnetic material, two pairs of auxiliary compensating permanent magnets of predetermined strength less than the strength of the first compensating magnet, the magnets of each pair of auxiliary compensating magnets lying in a plane parallel to the plane of the first compensating magnet with the magnetic axes of the auxiliary compensating magnets arranged symmetrically about the axis of the post, and means mounting the auxiliary compensating magnets for adjustment about axes parallel to the post axis to provide a fine adjustment for compensating for the remaining magnetism of external magnetic material.

7. In a magnetic compass having an upstanding post in a liquid compartment, a disc with a circular scale, means mounting the disc on the post for rotation and tilting movement relative thereto, and a pair of primary permanent magnets secured to the disc on opposite sides of the post in generally parallel relationship, a first compensating permanent magnet of predetermined magnetic strength having its axis passing through the axis of the post and lying in a plane normal to the axis of the post, means mounting the compensating magnet for adjustment about the axis of the post to provide a coarse adjustment for compensating for a substantial portion of the magnetism of external magnetic material, two pairs of auxiliary compensating permanent magnets of predetermined strength less than the strength of the first compensating magnet, and means adjustably mounting the auxiliary compensating magnets to provide a fine adjustment for compensating for the remaining magnetism of external magnetic material.

8. In a magnetic compass having a disc with a circular scale, means mounting the disc for rotation and tilting movement, and a pair of primary permanent magnets secured to the disc in generally parallel relationship in a plane parallel to the plane of the disc, means for compensating for the magnetism of adjacent external masses of magnetic material, comprising, a first compensating permanent magnet of predetermined magnetic strength having its magnetic axis lying in a plane parallel to the plane of the primary magnets when the compass is level and having its magnetic axis lying between and extending in a direction parallel to the axis of the primary magnets when the compass indicates zero deviation from north and when the compensating magnet is adjusted for zero compensation; means mounting the compensating magnet for adjustment in the above mentioned plane in which it lies about an axis normal to such plane to provide a coarse adjustment for compensating for a substantial portion of the magnetism of adjacent external masses of magnetic material, two pairs of auxiliary compensating permanent magnets of predetermined magnetic strength less than the strength of the first recited compensating magnet, the magnets of each pair being parallel and lying in a plane parallel to the plane of the first compensating magnet, with the magnets of one pair lying on opposite sides of and being parallel to the first compensating magnet and normal to the magnets of the other pair when all the compensating magnets are adjusted for zero compensation, and means mounting the magnets of each pair for adjustment about axes normal to the plane in which they lie to provide a fine adjustment for compensating for the remaining magnetism of adjacent external masses of magnetic material.

9. In a magnetic compass having a disc with a circular scale, means mounting the disc for rotation and tilting movement, and a pair of primary permanent magnets secured to the disc in generally parallel relationship in a plane parallel to the plane of the disc, means for compensating for the magnetism of adjacent external masses of magnetic material, comprising, a first compensating permanent magnet of predetermined magnetic strength having its axis lying in a plane parallel to the plane of the primary magnets when the compass is level and having its axis lying between and extending in a direction parallel to the axes of the primary magnets when the compass indicates zero deviation and when the compensating magnet is adjusted for zero compensation, means mounting the compensating magnet for adjustment in the above mentioned plane in which it lies about an axis normal to such plane to provide a coarse adjustment for compensating for a substantial portion of the magnetism of adjacent external masses of magnetic material, and a plurality of auxiliary compensating permanent magnets of predetermined magnetic strength less than the strength of the first recited compensating magnet adjustably mounted to provide a fine adjustment for compensating for the remaining magnetism of adjacent external masses of magnetic material.

10. In a magnetic compass, an inverted liquid bowl terminating at its base in an annular rim including an outwardly extending flange, a diaphragm closing the bottom of the bowl and having its periphery secured to said rim to form a liquid-tight joint, a compass case comprising a cup-shaped case bottom and a separate sleeve telescopically mounted on the upper portion of the case bottom, an inwardly extending, downwardly facing annular shoulder formed in said sleeve and engaging the upper surface of the outwardly extending flange at the base of the bowl, and means supporting the bowl on the upper end of the cup-shaped case bottom including a dish-shaped spacer fitted in said sleeve and having a raised periphery engaging the bottom surface of the flange at the base of the bowl, and a retaining ring having concentric corrugations including an inner corrugation supporting the dish-shaped spacer and an outer corrugation supported on the top rim of the cup-shaped case bottom to resiliently retain the bowl in said sleeve.

References Cited in the file of this patent

UNITED STATES PATENTS

| | | |
|---|---|---|
| 2,020,905 | Robert | Nov. 12, 1935 |
| 2,280,726 | Sperry | Apr. 21, 1942 |
| 2,446,568 | Wolfe | Aug. 10, 1948 |
| 2,552,332 | Le Van | May 8, 1951 |

FOREIGN PATENTS

| | | |
|---|---|---|
| 10,053 | Great Britain | July 10, 1888 |
| 116,806 | Great Britain | June 27, 1918 |
| 582,691 | Great Britain | Nov. 25, 1946 |
| 602,931 | Great Britain | June 4, 1948 |